(12) United States Patent
Ben-Arie et al.

(10) Patent No.: US 10,771,292 B2
(45) Date of Patent: Sep. 8, 2020

(54) OPTIMIZED ARCHITECTURE FOR A SIGNAL DECODER

(71) Applicant: Huawei Technologies Co., Ltd., Shenzhen (CN)

(72) Inventors: Yaron Ben-Arie, Munich (DE); Genadiy Tsodik, Munich (DE); Shimon Shilo, Munich (DE); Doron Ezri, Munich (DE); Oded Redlich, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/428,446

(22) Filed: May 31, 2019

(65) Prior Publication Data
US 2019/0288883 A1    Sep. 19, 2019

Related U.S. Application Data

(63) Continuation of application No. PCT/EP2017/050617, filed on Jan. 13, 2017.

(51) Int. Cl.
H04L 25/03    (2006.01)

(52) U.S. Cl.
CPC .. *H04L 25/03286* (2013.01); *H04L 25/03242* (2013.01); *H04L 25/03891* (2013.01); *H04L 2025/03426* (2013.01)

(58) Field of Classification Search
CPC ......... H04L 25/03286; H04L 25/03242; H04L 25/03891; H04L 2025/03426
USPC ....................................................... 375/297
See application file for complete search history.

(56) References Cited

U.S. PATENT DOCUMENTS

| | | | |
|---|---|---|---|
| 7,570,307 B2 * | 8/2009 | Iha | H03H 17/0219 348/571 |
| 7,720,175 B2 * | 5/2010 | Yeon | H04L 27/2624 375/296 |
| 7,826,549 B1 * | 11/2010 | Aggarwal | H03C 1/60 332/170 |

(Continued)

FOREIGN PATENT DOCUMENTS

| | | |
|---|---|---|
| CN | 101557281 A | 10/2009 |
| CN | 102006148 A | 4/2011 |

(Continued)

OTHER PUBLICATIONS

Markus Wenk et al., K-Best MIMO Detection VLSI Architectures Achieving up to 424 Mbps, ISCAS 2006, pp. 1151-1154. XP32457917.

(Continued)

*Primary Examiner* — James M Perez
(74) *Attorney, Agent, or Firm* — Slater Matsil, LLP (57) ABSTRACT

A device for determining a received signal as minimum values of a set of values, the device comprising a processor configured to: load a first set of values in a register; identify a maximum value of the first set of values and a minimum value of the first set of values; in the register, replace the maximum value by a value of a second set of values and simultaneously replace the minimum value by a new value, calculated based on the minimum value, to receive an updated first set of values; and repeat previous steps until all values of the updated first set of values are replaced by values of the second set of values.

13 Claims, 9 Drawing Sheets

(56) References Cited

U.S. PATENT DOCUMENTS

| | | | | |
|---|---|---|---|---|
| 8,432,220 B2* | 4/2013 | Peyresoubes | ......... | H03F 1/3247 330/149 |
| 8,665,977 B2* | 3/2014 | Cheng | ............. | H04L 27/34 375/261 |
| 8,711,957 B2* | 4/2014 | Lim | ............. | H04L 27/2614 370/204 |
| 8,817,900 B2* | 8/2014 | McGowan | ......... | H04L 27/2614 330/149 |
| 8,837,559 B2* | 9/2014 | Jovanovic | ......... | H04L 27/26 375/211 |
| 8,855,186 B2* | 10/2014 | Tan | ............. | H04L 25/03885 375/213 |
| 8,891,675 B2* | 11/2014 | Yang | ............. | H04L 25/03343 375/297 |
| 9,031,159 B2* | 5/2015 | Nishikawa | ......... | H04L 27/2614 375/297 |
| 9,031,160 B2* | 5/2015 | Nishikawa | ......... | H04L 1/1874 375/297 |
| 9,722,822 B1* | 8/2017 | Zhang | ............. | H04L 25/03343 |
| 10,340,987 B2* | 7/2019 | McCallister | ......... | H04B 7/0456 |
| 2006/0062337 A1 | 3/2006 | Iha et al. | | |
| 2007/0153673 A1* | 7/2007 | Tomisato | ............. | H04L 27/2614 370/208 |
| 2008/0064355 A1* | 3/2008 | Sutskover | ............. | H03J 7/04 455/255 |
| 2008/0144746 A1* | 6/2008 | Waters | ............. | H04L 25/03242 375/340 |
| 2010/0054365 A1 | 3/2010 | Cheng et al. | | |
| 2010/0329698 A1* | 12/2010 | Nakashima | ......... | H04B 10/6161 398/208 |
| 2011/0013729 A1* | 1/2011 | Yuba | ............. | H04L 27/2666 375/329 |
| 2011/0293033 A1* | 12/2011 | Kushnir | ............. | H04L 27/2614 375/295 |
| 2012/0027118 A1* | 2/2012 | Fang | ............. | H04B 3/32 375/285 |
| 2012/0045024 A1 | 2/2012 | Cui et al. | | |
| 2014/0153077 A1* | 6/2014 | Kawakami | ......... | H04L 27/364 359/259 |
| 2014/0185716 A1 | 7/2014 | Aubert | | |
| 2015/0003563 A1* | 1/2015 | Matsubara | ......... | H03F 1/3241 375/297 |
| 2015/0016568 A1* | 1/2015 | Nishikawa | ......... | H04L 27/262 375/297 |
| 2015/0049843 A1* | 2/2015 | Reuven | ............. | H04B 1/0475 375/297 |
| 2015/0172079 A1* | 6/2015 | Eliaz | ............. | G06F 11/10 375/285 |
| 2015/0194988 A1* | 7/2015 | Yan | ............. | H03F 3/24 375/297 |
| 2015/0341060 A1* | 11/2015 | Ishikawa | ............. | H03F 3/24 375/297 |
| 2015/0349916 A1* | 12/2015 | Murakami | ......... | H04L 25/03171 375/267 |
| 2015/0358038 A1* | 12/2015 | Koskinen | ......... | H04B 1/0475 375/297 |
| 2015/0381216 A1* | 12/2015 | Shor | ............. | H04B 1/0475 375/297 |
| 2016/0065254 A1* | 3/2016 | Park | ............. | H03F 1/3223 375/297 |
| 2016/0197627 A1* | 7/2016 | Qin | ............. | H03F 3/245 375/297 |
| 2017/0294986 A1* | 10/2017 | Khsiba | ............. | H04L 5/006 |
| 2018/0176049 A1* | 6/2018 | Nikitopoulos | ......... | G06F 16/2458 |
| 2018/0219711 A1* | 8/2018 | Laporte | ............. | H04B 7/0617 |

FOREIGN PATENT DOCUMENTS

| | | |
|---|---|---|
| CN | 102281091 A | 12/2011 |
| JP | 2013520941 A | 6/2013 |
| JP | 2014515568 A | 6/2014 |

OTHER PUBLICATIONS

Zhan Guo et al., "Algorithm and implementation of the K-best sphere decoding for MIMO detection," IEEE Journal on Selected Areas in Communications, vol. 24, No. 3, Mar. 2006, pp. 491-503.

* cited by examiner

| 27 | 23 | 14 | 11 | MAX | MIN |
|----|----|----|----|-----|-----|
| 22 | 17 | 8  | 9  |     |     |
| 7  | 2  | 5  | 6  | 7   | 2   |
| X  | 17 | 5  | 6  | 17  | 5   |
| X  | X  | 8  | 6  | 8   | 6   |
| X  | X  | X  | 9  | 9   | 9   |
| X  | X  | X  | X  | NEW | NEW |

FIG. 5A

| 27 | 23 | 14 | 11 | MAX | MIN |
|----|----|----|----|-----|-----|
| 22 | 17 | 8  | 9  |     |     |
| 7  | 2  | 5  | 6  | IDLE | 2  |
| 7  | 17 | 5  | 6  | 17  | 5   |
| 7  | X  | 8  | 6  | 8   | 6   |
| 7  | X  | X  | 9  | 9   | 7   |
| 7  | X  | X  | X  | IDLE | IDLE |
| X  | X  | X  | X  | IDLE | NEW |

OPTIMIZED ARCHITECTURE FOR A SIGNAL DECODER

CROSS-REFERENCE TO RELATED APPLICATIONS

This application is a continuation of International Application No. PCT/EP2017/050617, filed on Jan. 13, 2017 the disclosure of which is hereby incorporated by reference in its entirety.

BACKGROUND

Embodiments of the present invention relate to a single buffer processing of multiple inputs and, more particularly, but not exclusively, to a multiple input multiple output (MIMO) decoder architecture based on K-Best algorithm.

Recent versions of wireless standards adopt MIMO techniques, as they achieve very high spectral efficiency. Such techniques include a very high number of streams transmitted at the same frequency and time slot. Thus, the decoder is a very important and the most complicated part of an orthogonal frequency-division multiplexing (OFDM) receiver. The complexity of the optimal decoder (the maximum likelihood (ML) detection problem) is growing exponentially with higher modulation and higher number of transmitted streams. Therefore, the optimal solution is impractical. Alternatively, near-optimal solutions are used instead to achieve a reasonable performance with a relatively low complexity.

SUMMARY

It is an object of embodiments of the present invention to provide signal decoder architecture of small area and minimum latency.

The foregoing and other objects are achieved by the features of the independent claims. Further implementation forms are apparent from the dependent claims, the description and the figures.

According to a first aspect, there is provided a device for determining a received signal as minimum values of a set of values. The device comprising a processor configured to:
(a) load a first set of values in a register;
(d) identify a maximum value of the first set of values and a minimum value of the first set of values;
(e) in the register, replace the maximum value by a value of a second set of values and simultaneously replace the minimum value by a new value, calculated based on the minimum value, to receive an updated first set of values; and
(f) repeat steps (d) and (e) until all values of the updated first set of values are replaced by values of the second set of values.

According to a second aspect, there is provided a method for determining a received signal as minimum values of a set of values, comprising:
(a) loading a first set of values in a register;
(d) identifying a maximum value of the first set of values and a minimum value of the first set of values;
(e) in the register, replacing the maximum value by a value of a second set of values and, in particular simultaneously, replacing the minimum value by a new value, calculated based on the minimum value, to receive an updated first set of values; and
(f) repeating steps (d) and (e) until all values of the updated first set of values are replaced by values of the second set of values.

According to a third aspect, there is provided a software program product for determining a received signal as minimum values of a set of values, comprising: a non-transitory computer readable storage medium. First program instructions for loading a first set of values in a register. Second program instructions for identifying a maximum value of the first set of values and a minimum value of the first set of values. Third program instructions for, in the register, replacing the maximum value by a value of a second set of values and simultaneously replacing the minimum value by a new value, calculated based on the minimum value, to receive an updated first set of values. Fourth program instructions for repeating the first, second and third program instructions until all values of the updated first set of values are replaced by values of the second set of values. The first, second, third and fourth program instructions are executed by at least one computerized processor from the non-transitory computer readable storage medium.

In a first possible implementation form of the device, method and/or software program product according to any of the previous aspects, the processor is configured to repeat the steps (d) to (f) K times. With this repetition, K minimum values are identified.

In a second possible implementation form of the device, method and/or software program product according to any of the previous aspects as such or according to the first preceding implementation form of any of the previous aspects, a length of each of the first set of values and second set of values is K and the device calculates minimum values according to K-best optimization.

In a third possible implementation form of the device, method and/or software program product according to any of the previous aspects as such or according to the any of the preceding implementation forms of any of the previous aspects, the processor is configured to: (b) before step (d), identify a first minimum value of the first set of values; and (c) in the register and after step (b), replace the first minimum value with a new value, calculated based on the minimum value, to receive an updated first set of values. This allows each value to compete with all other values and optimizes the result of the minimum selection.

In a fourth possible implementation form of the device, method and/or software program product according to any of the previous aspects as such or according to the any of the preceding implementation forms of any of the previous aspects, the values in the first and second sets of values are values related to two different subcarriers in a respective symbol, in particular partial euclidean distances (PED) related to a respective quadrature amplitude modulation (QAM) or phase-shift keying (PSK) modulated symbol.

In a fifth possible implementation form of the device, method and/or software program product according to any of the previous aspects as such or according to the any of the preceding implementation forms of any of the previous aspects, the signal is based on an orthogonal frequency-division multiplexing (OFDM) communication and wherein the first set of values represents a signal of a first subcarrier and the second set of values represents a signal of a second subcarrier.

In a sixth possible implementation form of the device, method and/or software program product according to any of the previous aspects as such or according to the any of the preceding implementation forms of any of the previous aspects, the received signal is a wireless signal, in particular of a MIMO communication.

In a seventh possible implementation form of the device, method and/or software program product according to any of the previous aspects as such or according to the any of the preceding implementation forms of any of the previous aspects, identifying the maximum and the minimum values of the first set of values is done using a structure of two-values comparators. This architecture uses simple hardware unit repeatedly.

In an eighth possible implementation form of the device, method and/or software program product according to any of the previous aspects as such or according to the any of the preceding implementation forms of any of the previous aspects, identifying the maximum and the minimum values of the first set of values, includes force logic to ignore values of the second set of values in the register. This prevents mixture of the second set of values during the processing of the first set of values.

Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF ILLUSTRATIVE EMBODIMENTS

Embodiments of the present invention relate to a single buffer processing of multiple inputs and, more particularly, but not exclusively, to a multiple input multiple output (MIMO) decoder architecture based on K-Best algorithm.

According to some embodiments of the present invention, there is provided a mechanism for processing a first set of values in a register, while simultaneously loading a next set of values into the same register for processing next. This obviates the need for a double buffer, so only one register is used instead of a double register. This reduces space (i.e. small area) and/or minimizes latency.

Embodiments of the present invention may be implemented to improve computer performance and/or hardware design for a variety of processing tasks, currently performed using double buffer or multi buffer.

According to some embodiments, a first set of values of a received signal is loaded into the register and both a minimum value and a maximum value are identified. Then, the maximum value in the register is replaced by a value of a second set of values, and simultaneously, the minimum value is replaced by a new value calculated based on the minimum value, so an updated first set of values is formed. This process is repeated for until all values of the updated first set of values are replaced by the values of the second set, and the minimal values of the first set are found. This may then be repeated for all sets of values of the received signal.

In the context of a signal based on an orthogonal frequency-division multiplexing (OFDM) communication and optionally a MIMO decoder, each of the sets of values relates to a different subcarrier (SC) of the received signal. This mechanism may be implemented as part of a K-Best algorithm, wherein for every layer, K minimum values of partial Euclidean distances (PEDs) are found. This mechanism includes an optimized-area K-best Tree Layer structure that significantly reduces the needed logic, area and power, based on re-use of the same circuit (a hardware loop) to generate K new children of a current tree layer with a single hardware stage. The design may be adjusted to any K selected without any modification, by activating the hardware loop K times to calculate K initial costs.

Optionally, before finding the first maximum value, an idle cycle is performed where the first minimum value is replaced by a new value. This allows each value to compete with all others so selected values are correct.

Optionally, to prevent mixture between the sets of values both residing in the same register, a forced logic mechanism is implemented to prevent the values of the second set from being selected as either minimum or maximum until all values of the updated first set of values are replaced by the values of the second set.

According to other embodiments, other values may be found and/or other calculations performed, for example, finding an average of the values in a set of values.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Embodiments of the present invention may be a system, a method, and/or a computer program product. The computer program product may include a computer readable storage medium (or media) having computer readable program instructions thereon for causing a processor to carry out aspects of embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
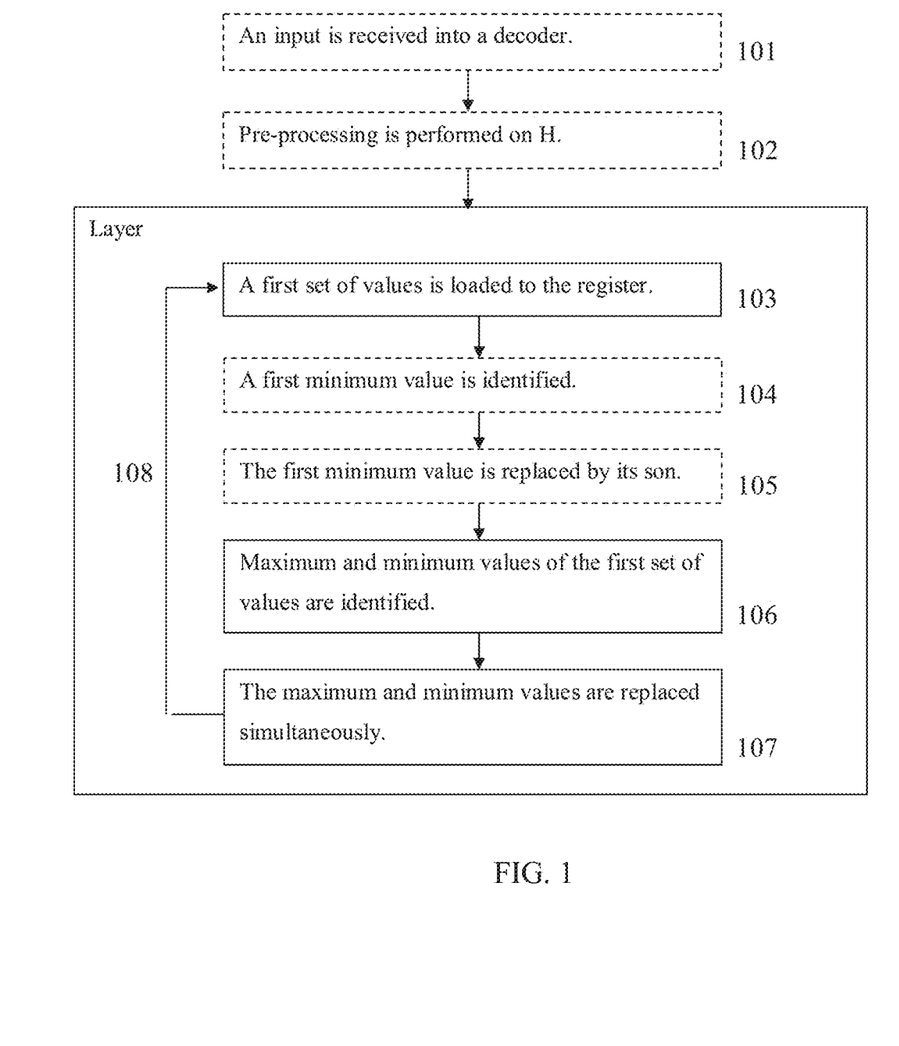
FIG. 1 is a flowchart schematically representing a process for determining a received signal as minimum values of a set of values according to the K-best optimization, according to some embodiments of the present invention.

Referring now to the drawings, FIG. 1 is a flowchart schematically representing a process for determining a received signal as minimum values of a set of values according to the K-best optimization, according to some embodiments of the present invention.

The K-Best algorithm is one of the most popular near-optimal solutions for finding the minimal values of PEDs (also referred to as Costs). In K-Best, the optimal exhaustive search (the maximum likelihood (ML) detection problem) is replaced by iterative search where the number of possible options per stream is reduced to K at each stage of the algorithm, choosing the lowest cost value 'child' from each 'father'. K is selected according to the required system performance. This technique allows achieving very good performance with much lower complexity than that of the optimal decoder.

First, optionally, as shown at 101, an input is received into a decoder. The input may be, for example, a MIMO signal. The signal is transferred to the decoder from the FFT block, and presented by a vector y. A channel matrix H is received from the channel estimation block. H is of size Nrx*Nst, when Nrx is the number of receiving antennas (the number of rows in H) and is Nst the number of transmitting antennas (the numbers of columns in H) is also 8. Nrx is also the size of y. The decoder recovers the vector symbol, modulated for example in respective quadrature amplitude modulation (QAM) or phase-shift keying (PSK) modulation.

K-Best algorithm requires a very complicated tree-like processing. For example, in an 8×8 real-valued MIMO decoder with 256QAM modulation (2*L=8 where L=4 is the number of image bits and of real bits), there are 2*8 layers in the tree and L-bits constellation. Each layer receives K (for example 32) PEDs (or Costs) and constellation histories (SHs) from the previous layer. SHs are (n+1)*L bits each, where n is the layer number (for example 16, 0 to 15). Each layer calculates K*2L=512 candidates of PEDs and constellations (s) and chooses the minimal K PEDs and their associated SHs to transfer to the next layer. Each chosen constellation s is concatenated to its chosen SH. For example, with K=32, L=4 and n=7, there are 32 SHs, 32-bits each (=4*(7+1)). For QAM256 modulation, the Bits per SC (Nbpsc) is 8. Thus, 512 costs has to be calculated and the lowest 32 has to be selected out of them, at each tree layer.

Optionally, a selective calculation is done to reduce the amount of calculations and cost candidates generation based on the known Schnorr-Euchner method (see for example: Mondal, S., Eltawil, A., Shen, C. and Salama, K. (2010) Design and Implementation of a Sort-Free K-Best Sphere Decoder. IEEE Transactions on Very Large Scale Integration (VLSI) Systems, 18, 1497-1501—specifically FIG. 3). For each found minimum, its (bigger) son is calculated and compared against the remaining 31 candidates, and so on. This way only 2K−1 costs are calculated. For example, for K=32, the number of candidates is reduced from 512 (16*K) to 63. One minimum is found out of 32, for 32 times, instead of 32 minimums out of 512.

Optionally, as shown at 102, pre-processing is performed on H. for example, this may include re-arranging H by a re-order block, decomposing H into H=Q*R where R is upper-triangular and Q is unitary.

Figure 2:
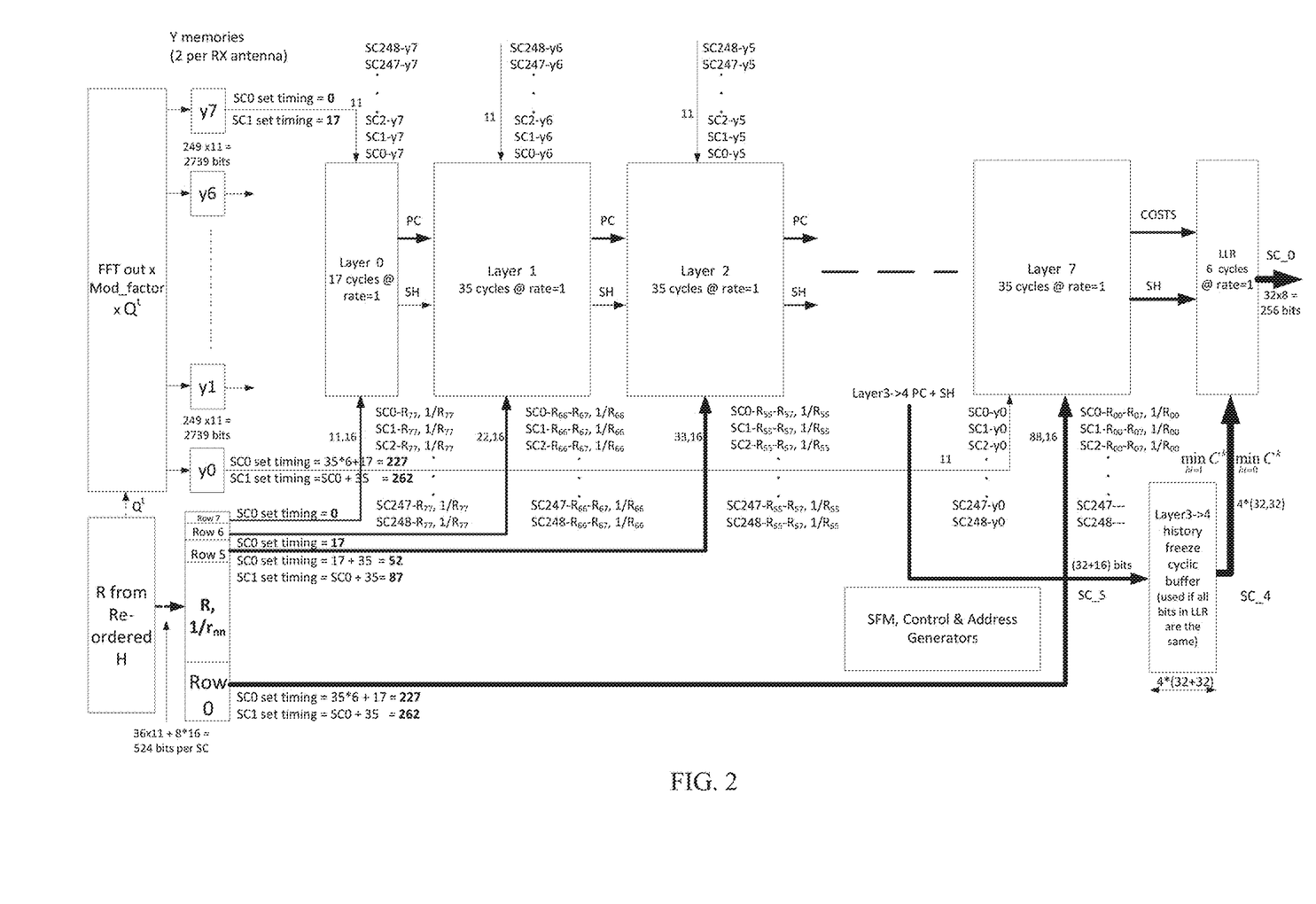
FIG. 2 is a schematic illustration of an exemplary top level design of a K-Best Serial (KBS) tree, according to some embodiments of the present invention.

Reference is now made to FIG. 2, which is a schematic illustration of an exemplary top level design of a K-Best Serial (KBS) tree, according to some embodiments of the present invention. In the illustration, the thickness of the lines represents the number of bits transferred. The tree is exemplified for a 4×4 matrix (8 tree layers). Fast Fourier transform (FFT) output is transferred to memories y0-y7 (two memories per receiving antenna). In this example y is of size 15 bits. The R matrix (from re-ordered H matrix) is saved to memories row0-row7 (each R row is a separate memory), with also 1/R. This is done to simplify the calculation in the layers. In this example each Rnm is of size 11 bits, and 1/R is of size 16 bits to allow more accuracy in multiplication. Rnm contains row n of matrix R up to (not including) the diagonal element r.

Layer 0 receives input from memories y0-y7 and calculates first child costs. Then, each tree layer receives previous costs (PC) and SH (4 bits added to SH every layer) from the previous layer. At each layer, a mechanism for finding minimums and maximums of the costs is applied.

Figure 3:
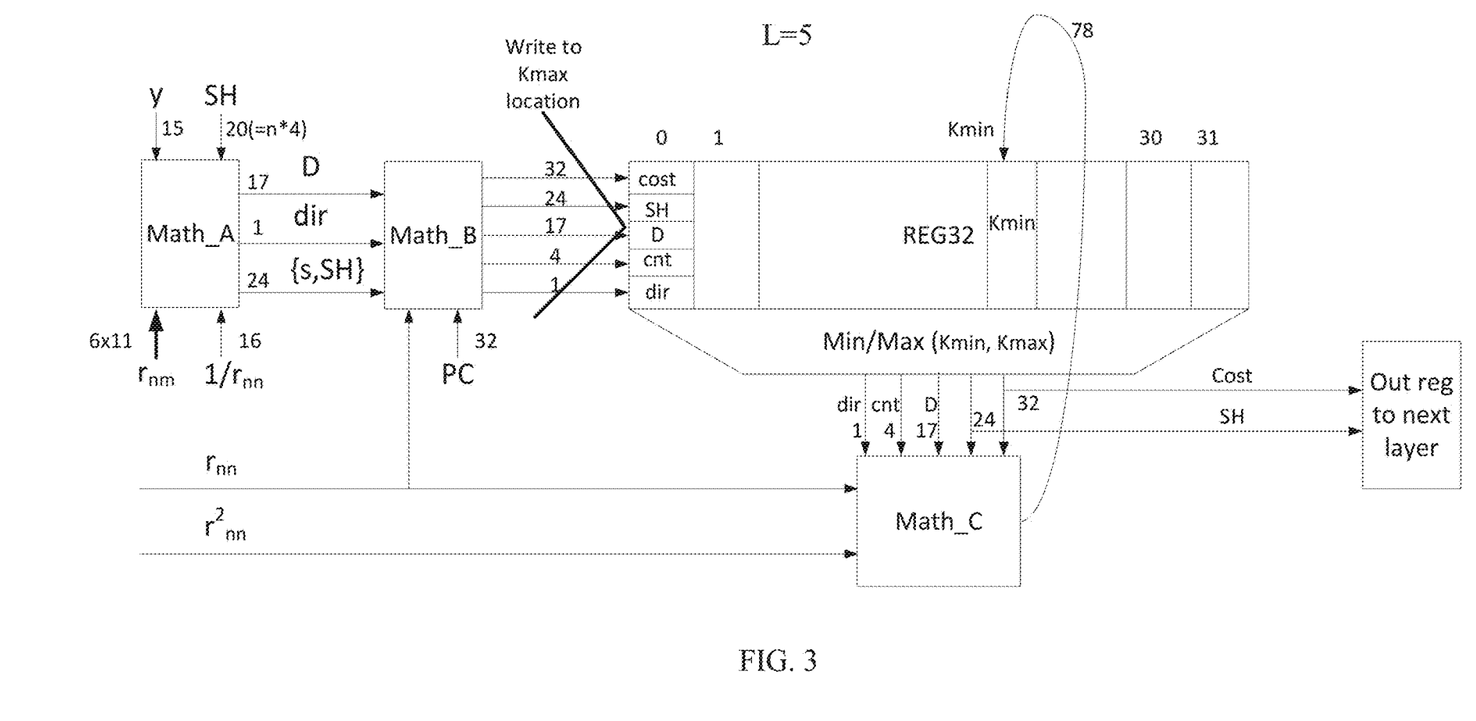
FIG. 3 is a schematic illustration of an exemplary KBS layer design, according to some embodiments of the present invention.
Figure 4:
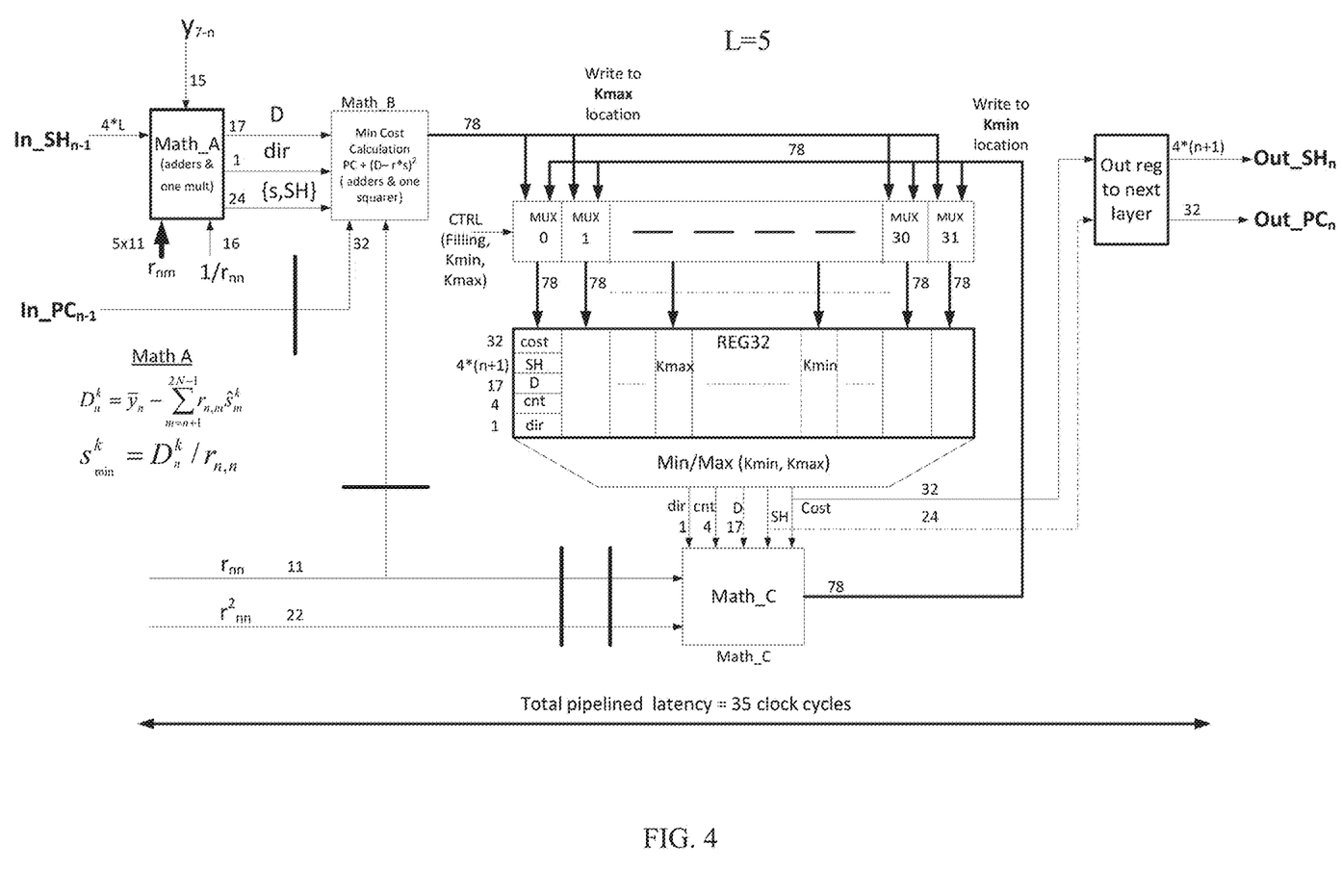
FIG. 4 is a schematic illustration of an exemplary detailed KBS layer design, according to some embodiments of the present invention.

Reference is now made to FIG. 3, which is a schematic illustration of an exemplary KBS layer design when for layer L=5, according to some embodiments of the present invention. Reference is also made to FIG. 4, which is a schematic illustration of an exemplary detailed KBS layer design when L=5, according to some embodiments of the present invention. The layer number L (0-7) determines the size of SH (=4*L) and the size of Rnm (=11*L). In these illustrations, thick lines indicate that a sample register is included. The diagram shows a minimal-area design, since the main register (REG32) and the minimum finding circuit are re-used K times, thus eliminating the need to duplicate this hardware per each next child.

As shown at 103, a first set of values is loaded to the register (REG32). The values are corresponding to a first subcarrier SC_o. In this example, 32 values, each value is of size 78 bit, are calculated by Math_B block and are written to the register.

Then, as shown at 106, a maximum value and a minimum value of the first set of values are identified, for example using MUX blocks as shown in FIG. 4 above the register. The minimum value is outputted to Math_C.

Then, as shown at 107, the maximum value (in location Kmax in the register) is replaced by a new entry that belongs to the next SC, and simultaneously, the minimum value (in location Kmin in the register) is replaced by its son, calculated by Math_C, to create an updated first set of values of the current SC. Writing to Kmin from Math_C is a critical path that determines the frequency of the process.

Then, as shown at 108, the process is repeated until all values of the updated first set (current SC) are replaced by new entries of the next SC.

Simultaneously with finding the minimum, the maximum is also found. Its location is used to store one of the Next_SC costs for Next_SC filling phase. This leads to minimum latency of this operation and to higher throughput in terms of SC rate. The rate of inputting subcarriers is f/(3+K) where f is the operating frequency. For example, for f=1GHz and K=32, the SC rate is 28.57 Msc/sec. Without the simultaneous operation, the SC rate is half this number, ~14 Msc/sec.

Figure 5A:
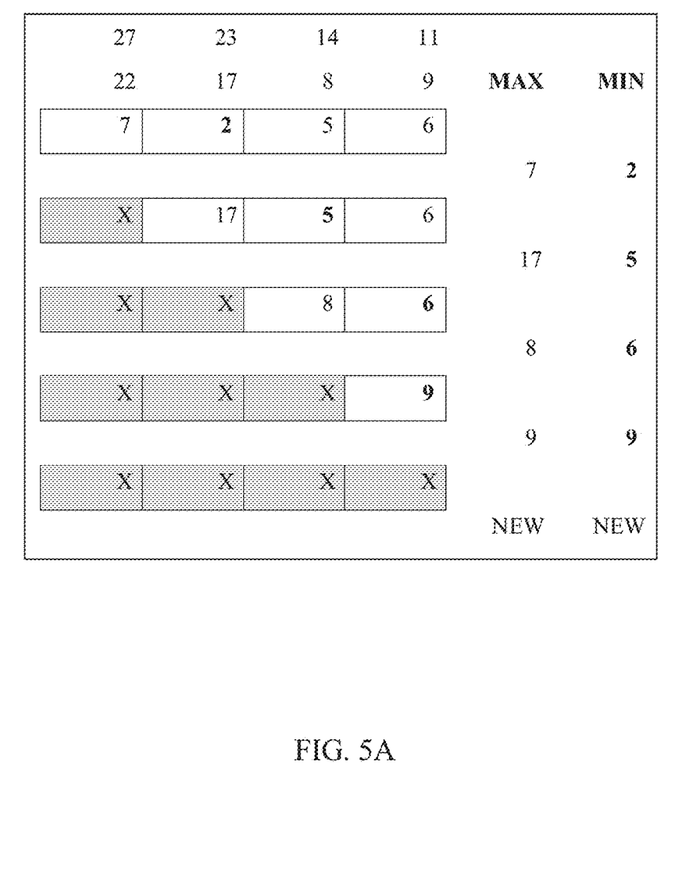
FIGS. 5A and 5B are schematic tables of a min/max finding process without and with an idle cycle respectively, according to some embodiments of the present invention.
Figure 5B:
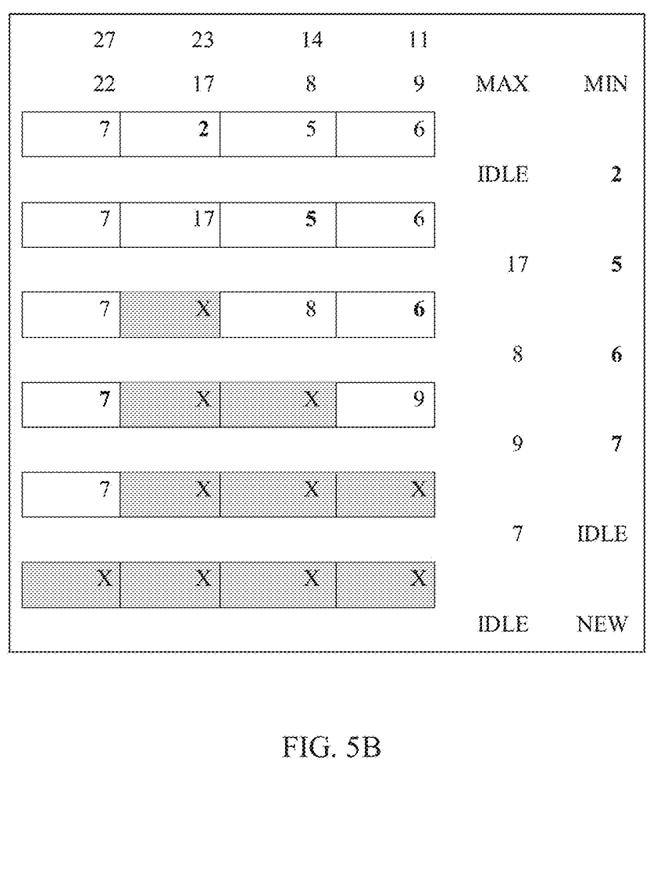

Reference is now made to FIGS. 5A and 5B, which are schematic tables of a min/max finding process without and with an idle cycle respectively, according to some embodiments of the present invention. The numbers marked in bold are the minimal costs found. The numbers above the table indicted future next costs (NCs), to be calculated only when and if needed. The 'X's are Next_SC costs that were written at the found maximum's place and are excluded from the current SC min/max finding.

Optionally, an idle cycle is added before finding the first maximum. As shown at 104, a first minimum value is identified and replaces by its son, as shown at 105. This allows all values to compete with all other values. As shown in FIG. 5A which includes only K cycles (K=4), the selected costs are not the lowest. As shown in FIG. 5B, an idle cycle is added at the start of the MAX path and at the end of the MIN path, so the process takes K+1 cycles (0 to 4). At time 5, the Next_SC processing starts.

At time #0, the found minimum is 2 (it is output to MIN), 17 is calculated as its NC and written in place of 2.

At time #1, the found minimum is 5 (it is output to MIN), 8 is calculated as its NC and written in place of 5. In parallel, 17 is the found maximum, so the next SC's cost is overwriting it (denoted as X).

At time #2, the found minimum is 6 (it is output to MIN), 9 is calculated as its NC and written in place of 6. In parallel, 8 is the found maximum, so the next SC's cost is overwriting it (denoted as X).

At time #3, the last found minimum is 7 (it is output to MIN). In parallel, 9 is the found maximum, so the next SC's cost is overwriting it (denoted as X).

At time #4, last cycle of this SC. The last cost of next SC is overwriting the value 7, so K minimum values are defined. At the end of the K+1 cycles, K minimums (out of 16*K=512 possible values) are delivered to the next tree layer and REG32 is filled with K new candidates (=X2) of the next SC.

At time #5, next SC processing begins.

Figure 6:
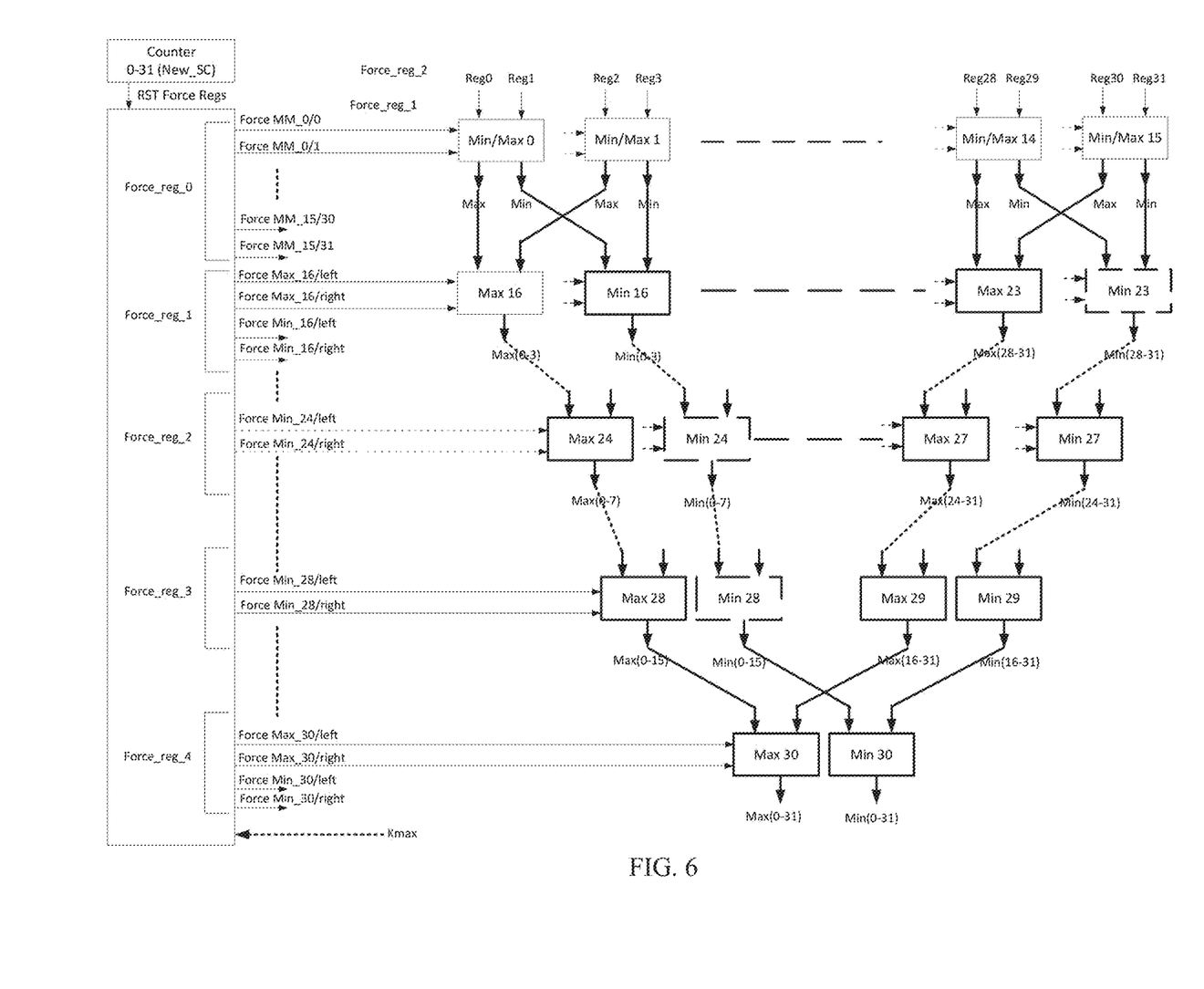
FIG. 6 is a schematic illustration of a structure of a min/max finding process, according to some embodiments of the present invention.
Figure 7:
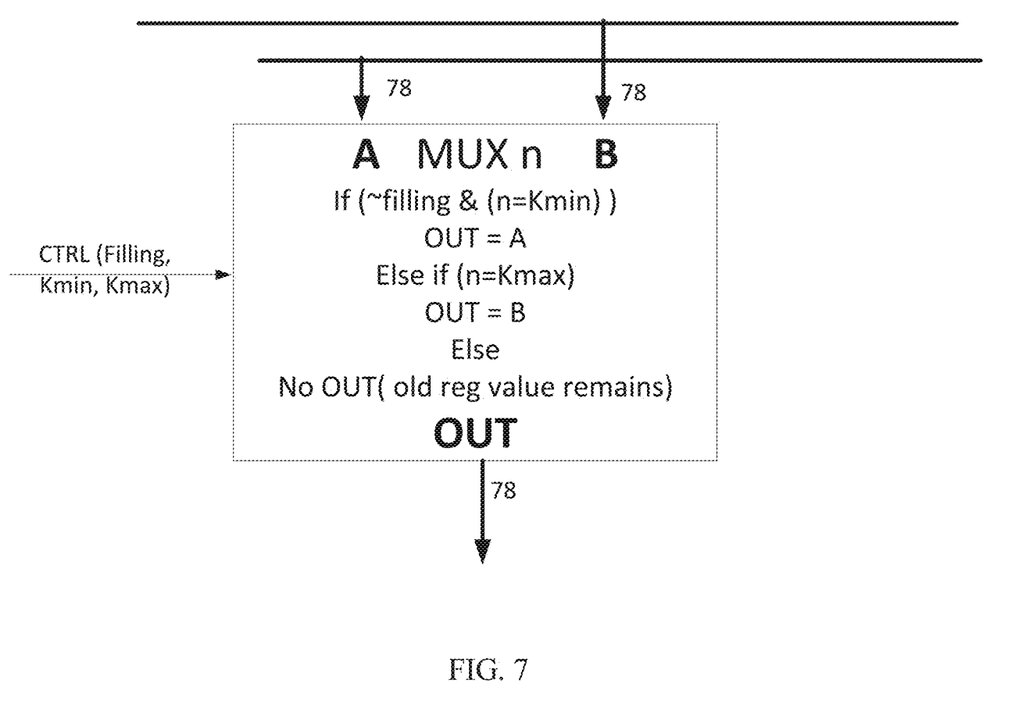
FIG. 7 is a schematic illustration of a structure of a MUX unit in a min/max finding process, according to some embodiments of the present invention.

Reference is now made to FIG. 6, which is a schematic illustration of a structure of a min/max finding process, according to some embodiments of the present invention. Each unit shown is a simple 2-values comparator, comprised of a simple adder where only the carry is used (but not the sum). The unit is referred to as MUX. At each stage of the process, the MUX units select the minimum and maximum of each two values and transfer the result to the next MUX. Reference is also made to FIG. 7, which is a schematic illustration of a structure of a MUX unit in a min/max finding process when L=5, according to some embodiments of the present invention. The mux units, numbered n (n=0 to n=31), do not change their REG32 entry when n does not equal Kmin or Kmax.

Optionally, the min/max finding process includes a control logic that prevents new SC values to participate in the process. This is needed due to both SCs cost candidates residing in REG32 together, for example SC_0 in process and SC_1 being filled. Force_reg_0 to Force_reg_4 indicate to the MUXs to ignore the new SC values. A counter 0-30 resets the Force_regs when a New_Sc starts processing. Each relevant force_reg receives Kmax as input and indicates to the relevant MUX to ignore the new value added and select the other one. When both values are to be ignored, the next Force_reg indicates to the next MUX to ignore the input from the current MUX. For example, when Kmax=3, Reg3 input is eliminated from the current min/max process by forcing Reg2 input to be chosen both for max and min as output to the next min/max layer, regardless of the value in Reg3 (which is already occupied by the next SC). This is done by an output Force_MM_1/2 (not shown in the diagram) of Force_Reg_0. At the next cycle, when Kmax=2, Reg2 input is eliminated. Since both inputs to Box Min/Max 1 are to be eliminated, this is done in the next layer, controlled by Force_reg_1, for both Min and Max. This is achieved by outputs Force_max_16 and Force_min_16. The process continues down the 5-layers of the min/max mechanism.

Figure 8:
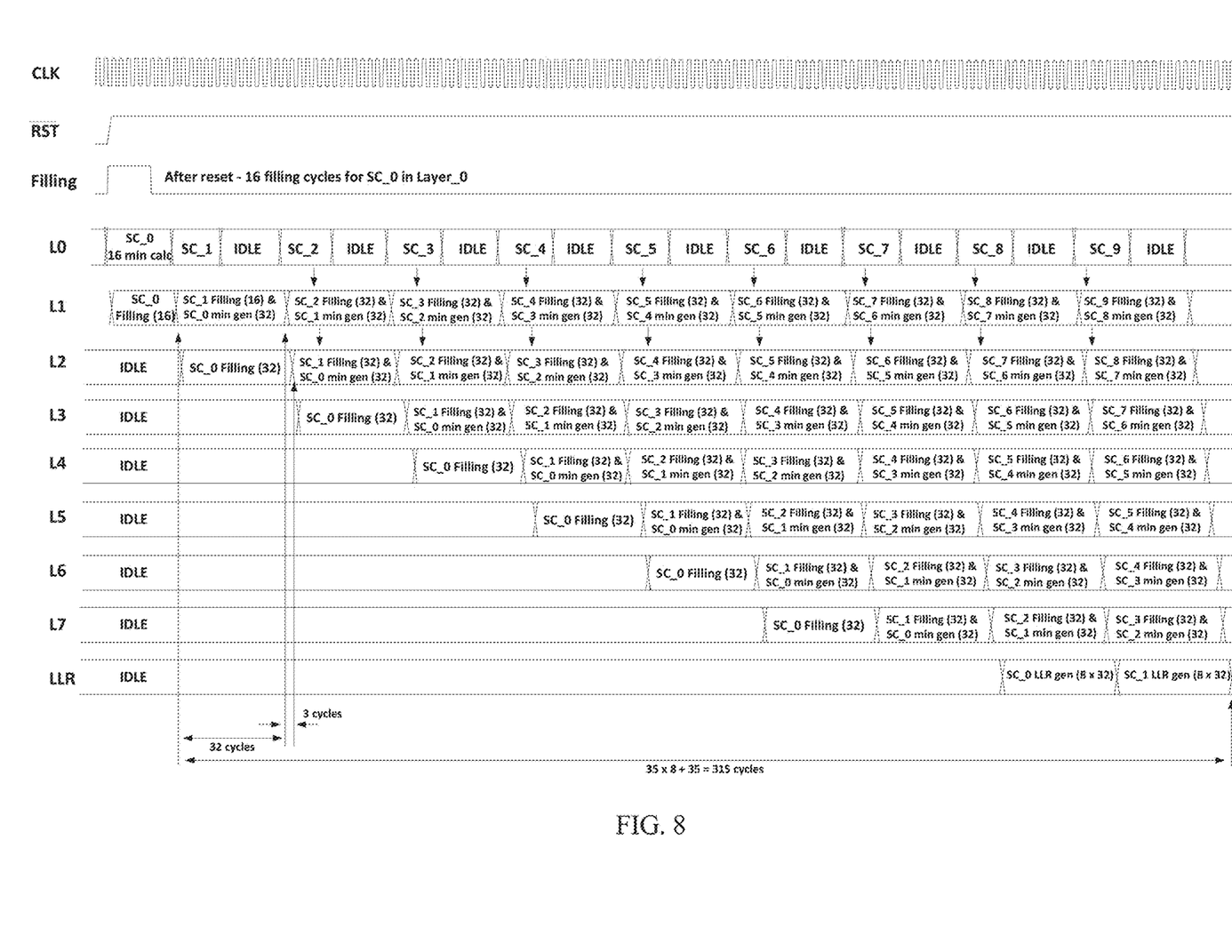
FIG. 8 is a schematic illustration of an exemplary top level timing of a KBS, according to some embodiments of the present invention.
Figure 9:
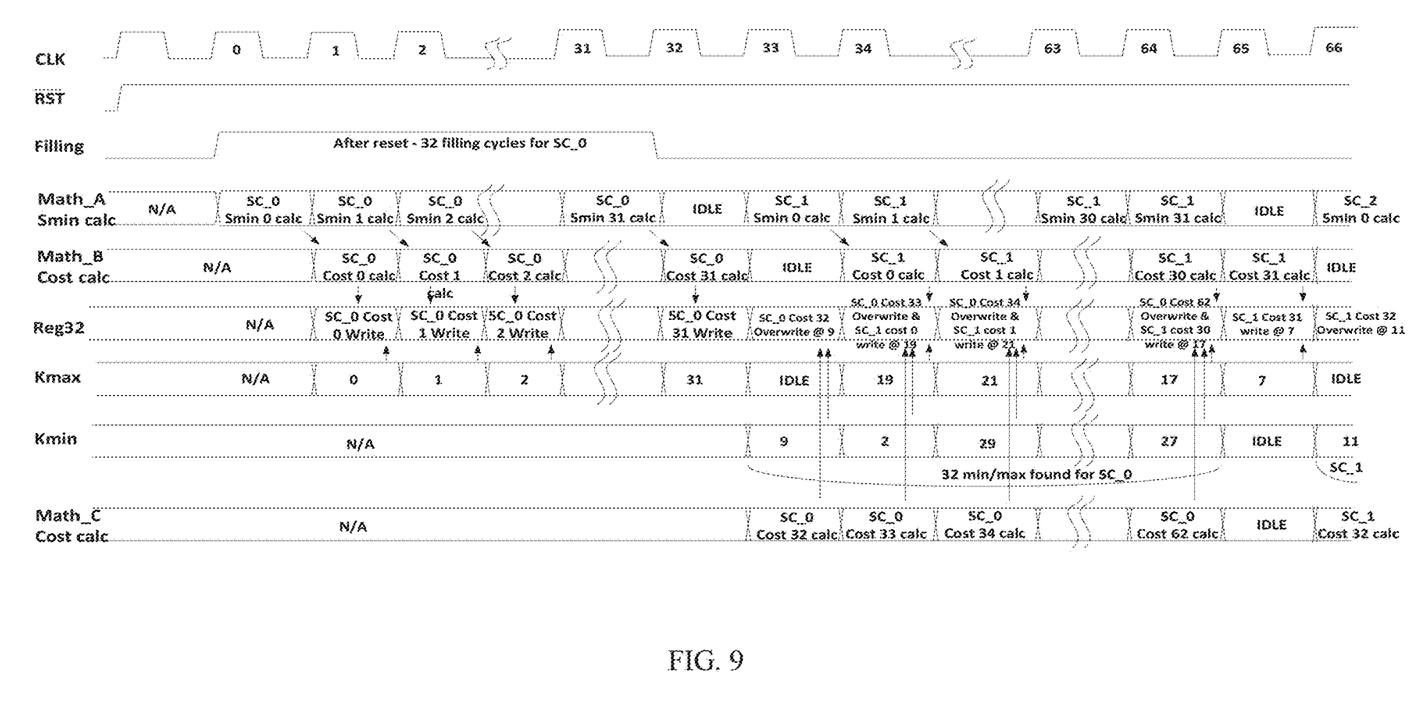
FIG. 9 is a schematic illustration of an exemplary layer timing of a KBS, according to some embodiments of the present invention.

Reference is now made to FIG. 8, which is a schematic illustration of an exemplary top level timing of a KBS, according to some embodiments of the present invention. One SC completes its tree passage within 315 cycles, 35 cycles per layer. Reference is also made to FIG. 9, which is a schematic illustration of an exemplary layer timing of a KBS (not layer 0), according to some embodiments of the present invention. The filling phase for SC_0 takes K (=32) clock cycles, after which the min/max process begins for SC_0, in parallel to SC_1 filling phase (both executed during the next 32 clock cycles 33 to 64). As shown, Math_A drives Math_B that updates Reg32 at Kmax location, Math_C updates Reg32 at Kmin location. The parallelism is a major latency reduction factor, instead of 64 cycles, there are 35 cycles per SC (the min/max stage takes 32 cycles+one Math_A cycle+one IDLE cycle+Out reg cycle).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant signal decoders will be developed and the scope of the term signal decoder is intended to include all such new technologies a priori.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A device comprising:
a receiver configured to receive a signal;
a processor configured to:
load a first set of values in a register, the first set of values correspond to a first subcarrier of the signal;
identify a maximum value of the first set of values and a minimum value of the first set of values;
update the first set of values by, in the register, replacing the maximum value with a value of a second set of values and replacing the minimum value with a value calculated according to the minimum value, the second set of values correspond to a second subcarrier of the signal, and the second subcarrier is different from the first subcarrier; and
repeatedly identify the maximum value of the first set of values, identify the minimum value of the first set of values, and update the first set of values by, in the register, replacing the maximum value with a value of the second set of values and replacing the minimum value with a value calculated according to the minimum value until all values of the first set of values are replaced with values of the second set of values.

2. The device according to claim 1, wherein said processor is configured to repeatedly identify the maximum value of the first set of values, identify the minimum value of the first set of values, and update the first set of values by, in the register, replacing the maximum value with a value of the second set of values and replacing the minimum value with a value calculated according to the minimum value K times, wherein K is a preset integer.

3. The device according to claim 1, wherein a respective length of each of the first set of values and the second set of values is K, and the processor is configured to calculate minimum values according to K-best optimization.

4. The device according to claim 1, wherein said processor is configured to:
before identifying the maximum value of the first set of values and the minimum value of the first set of values, identify a first minimum value of said first set of values; and
in said register and after step identifying the first minimum value of the first set of values, update the first set of values by replacing the first minimum value with a value calculated according to the first minimum value.

5. The device according to claim 1, wherein the first subcarrier and the second subcarrier are two different subcarriers in a respective symbol, wherein the two different subcarriers correspond to partial euclidean distances (PED) of a respective quadrature amplitude modulation (QAM) symbol or a respective phase-shift keying (PSK) modulated symbol.

6. The device according to claim 1, the signal is in accordance with an orthogonal frequency-division multiplexing (OFDM) communication.

7. The device according to claim 1, wherein the signal is a wireless signal of a MIMO communication.

8. The device according to claim 1, wherein identifying the maximum value and the minimum value of the first set of values comprises using a structure of two-values comparators.

9. The device according to claim 1, wherein identifying the maximum value and the minimum value of the first set of values comprises force logic to ignore values of the second set of values in the register.

10. A method, comprising:
receiving a signal;
loading a first set of values in a register, the first set of values correspond to a first subcarrier of the signal;
identifying a maximum value of the first set of values and a minimum value of the first set of values;
updating the first set of values by, in said register, replacing the maximum value with a value of a second set of values and simultaneously replacing the minimum value with a value calculated according to the minimum value, the second set of values correspond to a second subcarrier of the signal, and the second subcarrier is different from the first subcarrier; and
repeatedly identifying the maximum value of the first set of values, identifying the minimum value of the first set of values, and updating the first set of values by, in the register, replacing the maximum value with a value of the second set of values and replacing the minimum value with a value calculated according to the minimum value until all values of the first set of values are replaced with values of the second set of values.

11. The method of claim 10, further comprising:
before identifying the maximum value of the first set of values and the minimum value of the first set of values, identifying a first minimum value of said first set of values; and
in said register and after step identifying the first minimum value of the first set of values, updating the first set of values by replacing the first minimum value with a value calculated according to the first minimum value.

12. A non-transitory computer readable storage medium within a device, the device comprising a receiver configured to receive a signal, and the non-transitory computer readable storage medium comprising instructions that when executed by one or more processors within the device, configure the one or processors to execute instructions to:
execute first program instructions for loading a first set of values in a register, the first set of values correspond to a first subcarrier of the signal;
execute second program instructions for identifying a maximum value of the first set of values and a minimum value of the first set of values;
execute third program instructions for updating the first set of values by, in said register, replacing the maximum value with a value of a second set of values and simultaneously replacing the minimum value with a value calculated according to the minimum value, the second set of values correspond to a second subcarrier of the signal, and the second subcarrier is different from the first subcarrier; and
execute fourth program instructions for repeating the first program instructions, the second program instructions, and the third program instructions until all values of the first set of values are replaced with values of the second set of values.

13. The non-transitory computer readable storage medium of claim 12, wherein the instructions comprise further instructions to:
before executing the second program instructions, execute fifth program instructions for identifying a first minimum value of said first set of values; and
after executing the fifth program instructions, executing sixth program instructions for in said register, updating the first set of values by replacing the first minimum value with a value calculated according to the first minimum value.

* * * * *